Nov. 27, 1945.　　H. H. TALBOYS ET AL　　2,389,749
DRILL CHUCK
Original Filed Feb. 10, 1941　　2 Sheets-Sheet 2
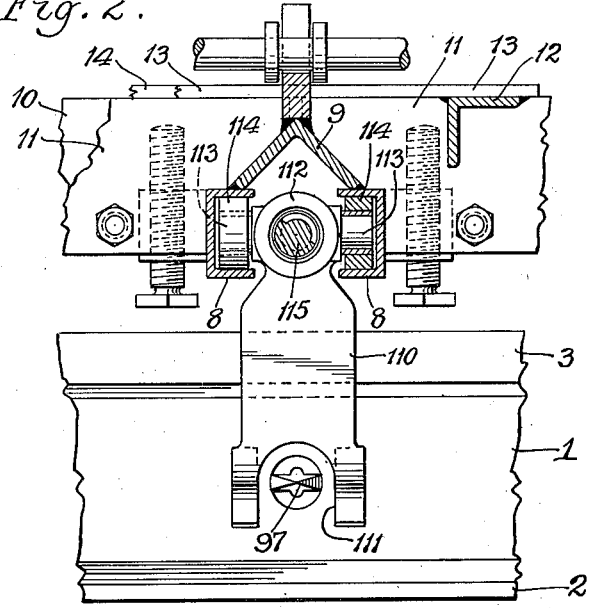
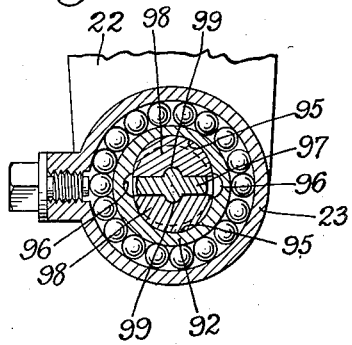
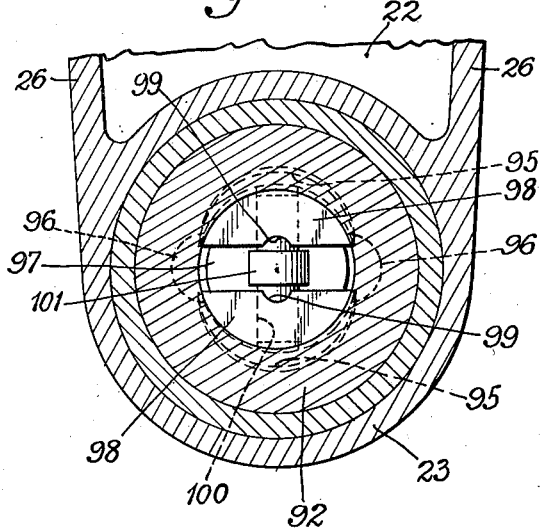
Inventors
Henry H. Talboys
Helmer E. Erickson
by Parker & Carter
Attorneys.

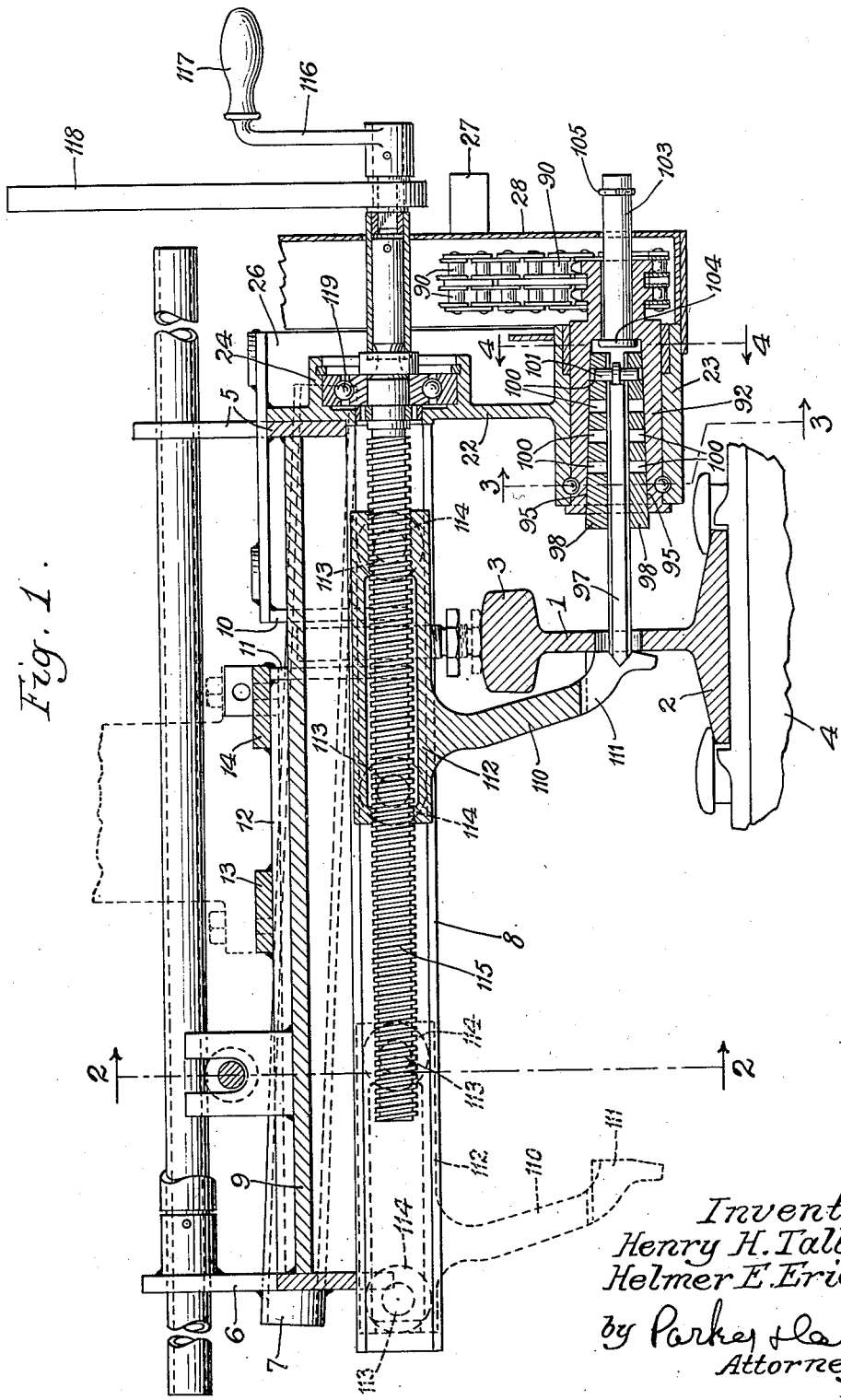

Patented Nov. 27, 1945

2,389,749

UNITED STATES PATENT OFFICE 2,389,749

DRILL CHUCK

Henry H. Talboys and Helmer E. Erickson, Milwaukee, Wis., assignors to Nordberg Manufacturing Co., Milwaukee, Wis., a corporation of Wisconsin Original application February 10, 1941, Serial No. 378,260. Divided and this application January 8, 1942, Serial No. 425,994

5 Claims. (Cl. 279—103)

Our invention relates to an improvement in drills and improved chucks therefor.

One purpose is the provision of an improved drill holder or chuck.

Another purpose is the provision of such a drill holder or chuck in which the drill and chuck may be advantageously held and fed during the drilling operation.

Another purpose is the provision of an improved chuck and bit for rail drills and the like.

Another purpose is the provision of improved means for kicking out or loosening the drill and chuck.

Other purposes will appear from time to time in the course of the specification and claims.

The present application is a division of our copending application Serial No. 378,260, filed in the United States Patent Office on February 10, 1941.

We illustrate our invention more or less diagrammatically in the accompanying drawings wherein:

Fig. 1 is an axial section illustrating the chuck and bit in operative position;

Fig. 2 is a section on an enlarged scale on the line 2—2 of Fig. 1;

Fig. 3 is a section on an enlarged scale on the the line 3—3 of Fig. 1; and

Fig. 4 is a section on the line 4—4 of Fig. 1.

Like parts are indicated by like symbols throughout the specification and drawings.

Referring to the drawings, 1 indicates any suitable member to be operated on, in this instance a rail having a lower flange 2 and an upper flange 3. The rail is shown as secured in position on any suitable tie or other support 4. We illustrate any suitable rail drill structure. The details do not of themselves form part of the present invention but are shown herein to indicate a practical application of our drill and chuck mechanism.

The rail drill structure may include for example frame members in the form of parallel side plates 5, 6, which may be connected for example by a tube 7 at each end and by channel members 8. The channels can also be connected by an inverted angle member 9, which may be welded to the upper flanges of the channels 8.

Extending between the tubes 7 are a pair of spaced parallel bars 10, 11, parallel with the side frame members 5, 6. They may, for example, be welded to the tubes 7. Extending between the bar 11 and the side frame member 6 are additional transverse supports or angles 12. Mounted upon the angles 12 are the longitudinally extending motor supporting bars 13, 14, the bar 14 resting also in part upon the support 11.

Also welded to the side frame member 5 is the bearing assembly, including the flat portion 22, carrying at the bottom a horizontal transversely extending cylindrical sleeve 23 for carrying the chuck structure below described. It also carries a bearing sleeve 24, the purpose of which will later appear. Outwardly extending from the flat portion 22 are side webs or walls 26, which are joined at the lower ends to the sleeve 23. Outwardly extending at the opposite sides thereof are the angles 27, to which is secured a housing 28 for housing the below described chain drive.

It will be understood that the frame is roughly centered over one rail or may be supported in that position in any suitable manner, as by any suitable outwardly extending rod, the details of which do not form part of the present invention and are not shown herein. The means for raising, lowering and centering the frame are not indicated in detail, as they do not of themselves form part of the present invention.

Any suitable motor not herein shown may be employed to drive the below described chuck or drill spindle. We illustrate for example sprocket chains 90, which extend to any suitable motor, not shown.

The sleeve or chuck spindle 92 has a pair of tapered seats 95, each one of which is semicircular in cross section at the outer end, converging to form a true circle, or its approximation, at the inner end. Separating these tapered seats are lateral enlargements which may be generally arcuate in cross section, shown for example at 96 in Figs. 3 and 4.

97 indicates a flat drill bit which is held between the chuck halves 98, the outer faces of which conform to the faces of the tapered seats 95 of the spindle 92. The chuck halves 98 are grooved as at 99 to hold the drill 97 in proper alignment. They are also provided with a plurality of aligning holes 100, which may receive a limit pin 101, which serves to position the inner end of the bit 97. It will be understood that as the bit wears down, the pin 101 may be advanced successively forwardly along the sequence of aligned holes 100. The chuck assembly is frictionally held in place by the seating of the chuck halves against the opposed tapered faces of the spindle 92.

As a ready means for kicking out the chuck we provide a kickout pin 103, having an enlarged head 104, within the cavity of the spindle 92, to limit its outward movement, and an exterior spring ring 105 to limit its inward penetration. It will be understood that when the drill is in use the pin 103 is not functioning, but a tap or push is sufficient to release the chuck by unseating the chuck halves 98, to permit the removal of the chuck for replacement or adjustment of the bit 97. The side enlargements 96 permit the employment of bits of a width greater than the diameter of the chuck halves, and of course a smaller bit can also be employed if desired.

In order to feed the drill we provide a dog 110, effective to engage a rail web on a side opposite the drill. It may be of any suitable form, and is provided with any suitable aperture 111 to permit the passage of the bit therethrough. The dog 110 is mounted on or forms part of the carriage 112, which has laterally extending pins 113, on which are mounted rollers 114, which ride within the channels 8. We illustrate two pairs of rollers 114, at each end of the carriage 112, as shown for example in Fig. 1. The carriage 112 is screw threaded upon the worm 115, and may be rotated, for example, by the exterior crank 116, with the handle 117. Any suitable ratchet 118 may be employed for final adjustment and for feeding the drill. It will be understood that the ratchet is reversible, the details not forming of themselves part of the present invention. The worm shaft as a whole is mounted in any suitable ball bearings 119 within the sleeve 25.

It will be realized that, whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

We claim:

1. In a drill chuck, a sleeve having an inwardly tapered bore, the inner end of the bore approximating a circular cross section, the cross section of the bore becoming increasingly oval from the inner end of the bore to the outer end, and defining a pair of diametrically opposed partial bores generally arcuate in cross section, and a pair of tapered chuck halves, each chuck half being generally arcuate in exterior cross section but decreasing in radial thickness from the outer to the inner end of the chuck halves, said chuck halves being penetrated by pairs of diametrically opposed apertures, and an abutment and centering member including an intermediate portion lying between the chuck halves and end members adapted to penetrate opposed apertures in said halves.

2. In a drill chuck, a sleeve having an inwardly tapered bore including diametrically opposed portions the inner surfaces of which are generally semi-cylindrical, the centers about which said semi-cylindrical surfaces are described being spaced apart and being slightly inclined in relation to each other and diverging outwardly toward the open end of the sleeve, a pair of tapered chuck halves adapted for insertion in said bore, their exterior surfaces being generally frusto-conic and adapted to conform generally to the cylindrical inner surfaces of the bore, one of said chuck halves being adapted slidably to seat in each of said cylindrical surfaces, and a drill limit element extending between said chuck halves and adjustable therealong, said chuck halves and limit element being unitarily and readily removable through the open end of said bore.

3. In a drill chuck, a sleeve having an inwardly tapered bore including diametrically opposed portions, the inner surfaces of which are generally semi-cylindrical, the centers about which said semi-cylindrical surfaces are described being spaced apart and being slightly inclined in relation to each other and diverging outwardly toward the open end of the sleeve, a pair of tapered chuck halves adapted for insertion in said bore, their exterior surfaces being generally frusto-conic and adapted to conform generally to the cylindrical inner surfaces of the bore, one of said chuck halves being adapted slidably to seat in each of said cylindrical surfaces, and a drill limit element extending between said chuck halves and adjustable therealong, said chuck halves and limit elements being unitarily and readily removable through the open end of said bore, each said chuck half being provided with a plurality of apertures in which the ends of said drill limit element may penetrate, the length of said drill limit element being less than the smallest diameter of the tapered bore.

4. In a drill chuck, a sleeve having an inwardly tapered bore including diametrically opposed portions the inner surfaces of which are generally semi-cylindrical, the centers about which said semi-cylindrical surfaces are described being spaced apart and being slightly inclined in relation to each other and diverging outwardly toward the open end of the sleeve, a pair of tapered chuck halves adapted for insertion in said bore, their exterior surfaces being generally frusto-conic and adapted to conform generally to the inner surfaces of the bore, their opposed inner surfaces being generally parallel with each other and with the axis of the chuck and having opposed longitudinally extending tool gripping channels, one of said chuck halves being adapted slidably to seat in each of said semi-cylindrical surfaces, and a tool limit element extending between said chuck halves and adjustable therealong, said chuck halves and tool limit element being unitarily and readily removable through the open end of said bore.

5. In a drill chuck, a sleeve having an open ended, inwardly tapered bore including diametrically opposed longitudinally extending chuck guiding recesses which are slightly inclined in relation to each other, and diverge outwardly toward the open end of the sleeve, a pair of tapered chuck halves adapted for insertion in said bore, their exterior surfaces conforming generally to the opposed inner surfaces of said guiding recesses, each of said chuck halves being adapted slidably to seat in one of said guiding recesses, each of said chuck halves having a series of transversely extending apertures spaced along the axis of the chuck, corresponding apertures of the two halves forming aligned pairs, and an adjustable drill limit element transversely extending between said chuck halves and positionable in one of said aligned pairs of apertures, and having end portions adapted slidably to penetrate said aligned apertures, said chuck halves and limit element being unitarily and readily removable as a group through the open end of said bore, the transverse extension of said drill limit element being less than the smallest internal diameter of bore, and means for preventing transverse movement of said limit element outwardly beyond the outer faces of said chuck halves.

HENRY H. TALBOYS.
HELMER E. ERICKSON.